No. 833,707. PATENTED OCT. 16, 1906.
M. B. CORCORAN.
VEHICLE AXLE AND SKEIN.
APPLICATION FILED JUNE 19, 1905.
2 SHEETS—SHEET 1.
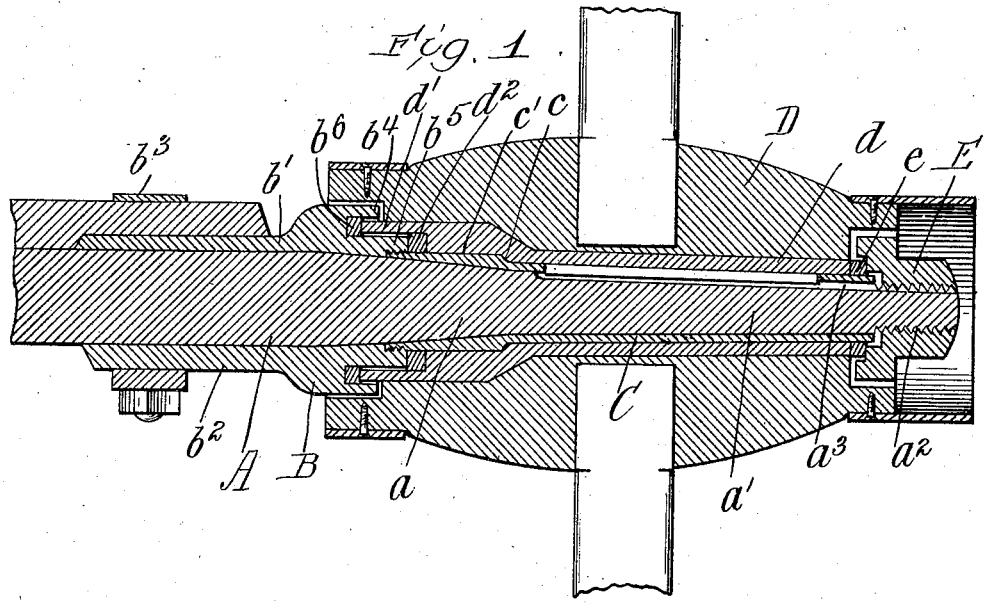
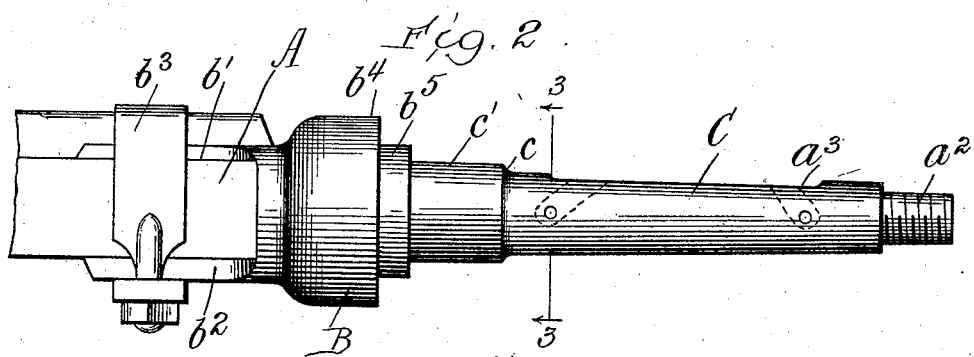
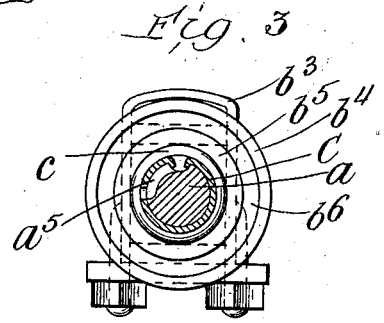
Witnesses
Ray White
Harry R. Levlute
Inventor
Michael Bert Corcoran
By Charles W. Hill Atty.

No. 833,707. PATENTED OCT. 16, 1906.
M. B. CORCORAN.
VEHICLE AXLE AND SKEIN.
APPLICATION FILED JUNE 19, 1905.

2 SHEETS—SHEET 2.

Witnesses
Ray White
Harry R. L. White

Inventor
Michael Bert Corcoran
By

UNITED STATES PATENT OFFICE.

MICHAEL BERT CORCORAN, OF HAMILTON, MONTANA, ASSIGNOR OF ONE-HALF TO JOHN C. McLEAN, OF HAMILTON, MONTANA.

VEHICLE AXLE AND SKEIN.

No. 833,707.   Specification of Letters Patent.   Patented Oct. 16, 1906.

Application filed June 19, 1905. Serial No. 265,851.

*To all whom it may concern:*

Be it known that I, MICHAEL BERT CORCORAN, a citizen of the United States, and a resident of the city of Hamilton, in the county of Ravalli, in the State of Montana, have invented certain new and useful Improvements in Vehicle Axles and Skeins; and I do hereby declare that the following is a full, clear, and exact description of the same, reference being had to the accompanying drawings, and to the letters of reference marked thereon, which form a part of this specification.

Ordinarily a comparatively short period of use is sufficient to so wear the axle, or with wooden axles the skein and the hub or hub-boxing, as to permit the wheel to have considerable play thereon, thereby causing the wheels to rattle and also unnecessarily increasing the draft, owing to imperfect fit. It has heretofore been necessary when the wear has become excessive to cut off the end of the axle and weld a new stub end thereon either larger than the original axle end or, if of the same size, to remove the boxing and insert one insuring a better fit. In case of wooden axles the skein and boxing are both usually renewed. Repairs of this nature are always expensive and entail the loss of considerable time. Furthermore, difficulty has always existed in suitably distributing the lubricating medium of whatever kind used to the entire bearing-surface of the axle or skein, and it has sometimes happened that while an excessive amount of lubricant may be delivered at one point on the axle or skein another point sometimes closely adjacent may be running dry.

It is an object of this invention to afford a construction whereby the hub will not only fit closely upon the axle or skein when the vehicle is new, but as well to afford means whereby the fit of the hub or boxing upon the axle can be positively assured at any time with minimum expenditure of time, trouble, and expense.

It is a further object of my invention to afford a construction whereby the lubricating medium or oil is distributed uniformly to the whole bearing-surface and to afford a construction wherein a reserve supply of lubricant is provided.

This invention consists in the matter hereinafter described, and more fully pointed out and defined in the appended claims.

Figure 4:
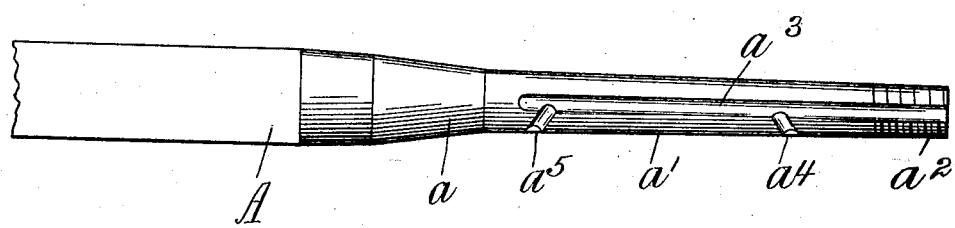
Figure 5:
Figure 6:
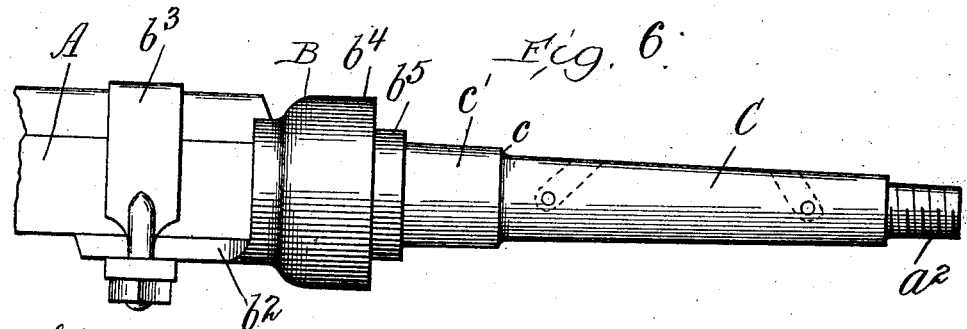

In the drawings, Figure 1 is an enlarged central vertical section of a device embodying my invention, showing the hub in place. Fig. 2 is a side elevation of the same with the hub removed. Fig. 3 is a section taken on line 3 3 of Fig. 2. Fig. 4 is a top plan view of the axle end with the sleeve or skein removed. Fig. 5 is a top plan view of the skein or sleeve. Fig. 6 is a side elevation showing a slightly-modified view of the abutment or shoulder piece.

As shown in said drawings, the axle end or stub $a$ $a'$ is welded to the steel axle A in the usual or any desired manner and comprises, as shown, a somewhat-abruptly-tapered section $a$ adjacent to the inner end of the hub and from which the axle tapers gradually and uniformly to its extremity in the usual manner. The end of the axle is threaded as usual, as indicated at $a^2$, and, as shown, the axle end is provided in its upper side or top with a longitudinal groove $a^3$, extending from near the inner end of the taper to the extremity of the axle, as shown in Fig. 4. From one side of said groove and extending obliquely downwardly are forwardly and rearwardly directed slots or grooves $a^4$ and $a^5$, which serve to conduct the oil from the groove $a^3$ downwardly.

Frictionally secured upon the axle is an abutment or shoulder piece B, which is cored at its center to fit the somewhat abrupt taper $a$ of the axle and is provided with one or more projections or straps $b'$ $b^2$ at its inner end, which fit closely above and below the axle and extend along the same and are rigidly secured thereto by means of clamping or strap bolts $b^3$, as shown in Figs. 1 and 2. As shown in Fig. 6, however, but one of said straps $b^2$ is shown, which extends beneath the axle and is rigidly engaged thereto by the said clamping-bolts. The outer face of said abutment or shoulder piece affords a bearing for the end of the hub D and comprises a peripheral forwardly-extending flange $b^4$, which affords an annular recess beneath the same to receive the washer $b^6$ and the forwardly-projecting flange $b^5$, closely adjacent to the axle and which at its extremity is reamed out to a size larger than the axle and is internally threaded, as shown in Fig. 1.

C indicates a removable sleeve or false skein shaped to fit exactly to the taper of the axle end or if a wooden axle to the skein and threaded externally at its inner end for threaded engagement with the thread of the shoulder or forwardly-directed flange $b^5$. As shown in Figs. 1 and 5, said sleeve or removable skein is slotted longitudinally for the greater portion of its length to correspond with the groove in the top of the axle and, as shown at said slot, the inner edges are turned inwardly, as shown in Fig. 3, to engage in said groove in the axle and rigidly hold the sleeve from turning when in use. As shown, also, a shoulder $c$ and a tapered portion $c'$ of greater diameter are provided near the inner end of the sleeve, thus increasing the thickness of the metal at that point, increasing strength, and conforming to the usual contour of axles at the inner end.

The hub D may be of course constructed as usual and is provided with the usual rigidly-secured internal boxing $d$, having at its inner end an annular forwardly-extending rim or flange $d'$, which fits within the recess formed by the forwardly-projecting flange $b^4$ of the abutment and bears against the leather or other suitable washer $b^6$ therein. The annular shoulder or flange $b^5$ is afforded a recess beneath the flange $d'$ and bears against a washer $d^2$, thus affording at the inner end of the hub bearing-washers, one within the hub, which reduce the friction to a minimum. At the outer end of said hub and fitted on the sleeve or removable skein C and bearing against the end of the boxing is a washer $e$, which fits within a recess in the nut E, secured on the ends of the axle. Said washers $b^6$, $d^2$, and $e$ are of sufficient thickness to prevent undue lateral movement of hub on the axle and serve, as is usual, to a certain extent to take up wear in the hub and on the axle.

The operation is as follows: The removable sleeve or skein C affords means for quickly remedying excessive wear, for should said sleeve or removable skein become somewhat worn it is only necessary to remove the wheel and loosen the clamping-bolt $b^3$ to permit the abutment B to be driven off on the axle sufficiently to loosen the same. The skein or sleeve C is then unthreaded from the abutment-piece and removed and a new one of the proper size is substituted, in which way it is possible in most instances to remedy the effects of wear without renewing the boxing in the hub. Should, however, the wear be excessive both in the boxing and on the sleeve, it may be necessary to remove and renew the boxing, as well as the complemental sleeve, thus insuring a perfect fit without cutting the axle, destruction of parts, long delay, or material expense.

Obviously when in use the groove in the top of the skein and axle serves as an oil-channel, and when filled with lubricant the same flows slowly down the grooves $a^4$ and $a^5$ and escapes to the bearing through relatively small apertures in the sleeve or skein C, as shown in Figs. 2, 3, and 6. Obviously the removable skein may be secured over the skein on a wooden axle, and various means may be employed for securing the same in place, and many details of construction may be varied without departing from the principles of my invention, and I therefore do not purpose limiting this application for patent otherwise than necessitated by the prior art.

I claim as my invention—

1. The combination with a tapered vehicle-axle of a shoulder-piece or abutment engaged thereon, bearing against the inner end of the hub, and a removable skein or sleeve positively engaged on the abutment and interlocking on the axle.

2. The combination of a vehicle-axle with a removable abutment thereon affording a bearing for the inner end of the hub and boxing, and a removable sleeve or skein interlocking with the axle, and positively engaging the abutment.

3. The combination of an axle having a longitudinal oil-groove therein of a sleeve or skein fitted thereon and grooved to correspond with the axle, the edges of said groove affording downturned flanges to engage in the axle-groove, said skein having apertures in its side communicating with the oil-groove, and through which the oil is delivered to the bearing.

4. A combination with a tapered axle, of an abutment or shoulder piece thereon having an interior taper to fit the axle, integral straps on said abutment adapted to be rigidly clamped upon the axle, concentric forwardly-projecting flanges on the abutment adapted to engage the inner end of the wheel-hub, an axle skein or sleeve fitted upon the axle and in threaded engagement with said abutment and adapted to fit closely in the wheel-boxing.

5. In a device of the class described a tapered sleeve or skein threaded externally at its larger end and having a longitudinal groove therein at its upper side and inwardly-turned flanges adjacent to the groove.

6. In a device of the class described the combination with a tapered vehicle-axle having a longitudinal oil-groove in the top thereof and downwardly slotted therefrom, of an abutment complementally apertured and adapted to afford a bearing for the inner end of the wheel-hub, integral straps on said abutment, lying above and below the axle and adapted to be rigidly clamped thereto, forwardly-projecting flanges concentric with the axle and adapted to engage in the inner end of the hub, an internal thread on the innermost of said flanges, and a sleeve or skein having threaded engagement with the abutment and having a longitudinal slot in the top thereof and flanges at each side thereof adapted to engage in the axle-slot and having apertures in its side registering with the downwardly-directed slots.

7. In a device of the class described the combination with an axle having a longitudinal oil-slot in the top extending to the end thereof, of an abutment at the inner end thereof adapted to afford a bearing for the inner end of the hub, and internally threaded at its outer end, a sleeve or skein having a slot corresponding with the slot in the axle, downwardly-turned flanges at each side of said slot to engage in said axle-slot, and screw-threads at the inner end of said sleeve to engage said abutment.

8. A skein or sleeve of the class described tapered internally to fit a metal axle and externally to fit in a wheel-boxing, and threaded at its larger end and having a central longitudinal groove in its upper side, the side walls of which are turned inwardly to interlock with the axle end.

9. An abutment or collar of the class described having an internal taper adapted to fit upon an axle, and affording integral straps whereby the same can be clamped thereto, concentric flanges extending oppositely from the straps, the innermost being internally threaded, to afford engagement with an axle sleeve or skein.

10. The combination with a tapered axle having a longitudinal groove in the upper side, of a shoulder-piece rigidly engaged on the inner end thereof, and a sleeve on the axle engaging the edges of said groove, said sleeve being threaded at its inner end and fitting in corresponding threads in the inner circumference of said shoulder-piece, said groove having apertures in the bottom thereof communicating with the outer circumference of said sleeve.

11. The combination with a tapered axle having a longitudinal slot in the top thereof and extending to its end and downwardly-inclined slots communicating therewith, of an abutment-collar tapered to fit thereto, and internally threaded at its end, and a sleeve or skein having a slot therein with downwardly-turned edges adapted to engage in the groove of the axle, and threaded for engagement with the abutment-collar, whereby said abutment-collar acts to lock the sleeve in adjusted position.

12. In a device of the class described an abutment-collar tapered internally to fit an axle end and having integral straps adapted to be rigidly engaged to the axle and an axle sleeve or skein having threaded engagement with the abutment-collar and interlocking on the axle.

In testimony thereof I have hereunto subscribed my name in the presence of two subscribing witnesses.

MICHAEL BERT CORCORAN.

Witnesses:
ELMER E. STOCKMAN,
ABIJAH F. HOBBS.